United States Patent
Okumura

(10) Patent No.: US 8,994,994 B2
(45) Date of Patent: Mar. 31, 2015

(54) CONTROLLER AND CONTROL METHOD

(71) Applicant: Seiko Epson Corporation, Tokyo (JP)

(72) Inventor: Yoshio Okumura, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/770,879

(22) Filed: Feb. 19, 2013

(65) Prior Publication Data

US 2013/0222846 A1 Aug. 29, 2013

(30) Foreign Application Priority Data

Feb. 27, 2012 (JP) ................. 2012-040478

(51) Int. Cl.
*G06F 15/00* (2006.01)
*G06F 3/12* (2006.01)

(52) U.S. Cl.
CPC ............ *G06F 3/1219* (2013.01); *G06F 3/1208* (2013.01); *G06F 3/1256* (2013.01); *G06F 3/1284* (2013.01)
USPC ............ 358/1.15; 358/1.13; 399/45; 399/341

(58) Field of Classification Search
None
See application file for complete search history.

(56) References Cited

U.S. PATENT DOCUMENTS

| | | | |
|---|---|---|---|
| 2008/0180726 A1* | 7/2008 | Selvaraj | 358/1.15 |
| 2009/0034998 A1* | 2/2009 | Omata | 399/45 |
| 2010/0134811 A1 | 6/2010 | Fukasawa et al. | 358/1.9 |
| 2012/0057177 A1* | 3/2012 | Yamamichi | 358/1.9 |

FOREIGN PATENT DOCUMENTS

| | | |
|---|---|---|
| JP | 2010-052225 | 3/2010 |
| JP | 2010-130405 | 6/2010 |

* cited by examiner

*Primary Examiner* — Vincent Rudolph
*Assistant Examiner* — Helen Q Zong
(74) *Attorney, Agent, or Firm* — DLA Piper LLP (US)

(57) ABSTRACT

A controller for use in a printing apparatus ejecting a metallic ink is configured to, on a user interface screen, display a reception portion that receives an item desired by a user with respect to a metallic texture, and a display portion that displays a printing-medium type suitable for the item.

5 Claims, 8 Drawing Sheets

| MEDIUM TYPE | UPPER AND LOWER LIMIT VALUES OF FIRST INDEX VALUE | UPPER AND LOWER LIMIT VALUES OF SECOND INDEX VALUE | VARIATION RATE OF SECOND INDEX VALUE | UPPER AND LOWER LIMIT VALUES OF AN AMOUNT OF INK |
|---|---|---|---|---|
| MEDIUM A | 55/25 | 27/22 | 0.17 | 70%/5% |
| MEDIUM B | ⋮ | ⋮ | ⋮ | ⋮ |
| MEDIUM C | ⋮ | ⋮ | ⋮ | ⋮ |
| MEDIUM D | ⋮ | ⋮ | ⋮ | ⋮ |
| ⋮ | | | | |

FIG. 7

| MEDIUM TYPE | UPPER AND LOWER LIMIT VALUES OF INDEX VALUE α | UPPER AND LOWER LIMIT VALUES OF INDEX VALUE β | UPPER AND LOWER LIMIT VALUES OF INDEX VALUE γ | ... | UPPER AND LOWER LIMIT VALUES OF AN AMOUNT OF INK |
|---|---|---|---|---|---|
| MEDIUM A | 55/25 | 27/22 | ... | ... | 70%/5% |
| MEDIUM B | ... | ... | ... | ... | ... |
| MEDIUM C | ... | ... | ... | ... | ... |
| MEDIUM D | ... | ... | ... | ... | ... |
| ... | | | | | |

DB

CONTROLLER AND CONTROL METHOD

CROSS-REFERENCE TO RELATED APPLICATIONS

The entire disclosure of Japanese Patent Application No. 2012-40478, filed Feb. 27, 2012 is expressly incorporated by reference herein.

BACKGROUND

1. Technical Field

The present invention relates to a controller and a control method for use in a printing control apparatus.

2. Related Art

Recently, printing employing a metallic ink, which is utilized to express distinctive glossy appearance and texture created by a metallic material (hereinafter, collectively referred to as a metallic texture) in printing results, has been performed. As a related technology, a printing control apparatus, which controls a texture of the surface of a printing object by controlling an ink amount of a metallic ink, has been well known to those skilled in the art (refer to JP-A-2010-130405).

As disclosed in JP-A-2010-130405, it is possible to, by controlling an ink amount of a metallic ink for use in printing, control a metallic texture in a printing result to a certain degree. The metallic texture appeared on a printing medium, however, largely depends on the characteristics of the printing medium to which a metallic ink is adhered. That is, even when printing using a metallic ink of the same amount is performed several times, if printing-medium types therefor are different from one another, resultant metallic textures are also different. Accordingly, unless relations between printing media and metallic textures can be grasped, it is difficult to control the metallic texture with accuracy. Further, in order to realize a user's desired metallic texture in printing results, it is necessary that a printing medium suitable for realizing the desired metallic texture is selected.

SUMMARY

An object of some aspects of the invention is to solve at least one of the aforementioned problems, and through clarification of relations between printing media and metallic textures, provide a printing control apparatus and an information recording method which can contribute to realization of a desired metallic texture to a great degree.

According to an aspect of the invention, a printing control apparatus is configured to include a storage portion that, for each of printing-medium types, stores therein information related to a range of an index value representing a metallic texture, within which a metallic texture appears in a result of printing which causes a metallic ink to be adhered onto a printing medium. According to this configuration, as information related to each of printing-medium types, a range of an index value, within which a metallic texture appears in a result of printing using a metallic ink, is stored in the storage portion. Thus, it is possible to, by referring to the above information, clarify relations between printing-medium types and metallic textures (that is, for each of printing-medium types, to what degree the metallic texture can be reproduced), and thus, the information brings about a great help when a user attempts to realize his or her desired metallic texture in printing results by using the printing control apparatus.

According to another aspect of the invention, a printing control apparatus includes a reception portion that receives a target value of the index value, and a display control portion that displays, on a predetermined user interface screen, at least one printing-medium type for which the target value is included within the range. According to this configuration, when the reception portion has received an input of a user's desired target value, at least one printing-medium type, which has a property of capable of reproducing the target value, is presented to the user through a user interface screen. Thus, the user can easily select a printing medium suitable for realizing his or her desired metallic texture.

According to another aspect of the invention, the above-described storage portion stores therein, for each of printing-medium types, information related to the range of the first index value within which the metallic texture appears, and a range of a second index value within which the appropriate metallic texture appears, the second index value being an index value that represents a metallic texture, and is different from the first index value. That is, regarding the index value representing the metallic texture, not only one kind exists, but plural kinds exist, and for each of printing-medium types, the ranges of the respective kinds of the index value may be stored in the storage portion as information. Examples that can be considered as the kind of the index value representing the metallic texture include a metallic degree calculated on the basis of respective luminance degrees of reflection light rays at different angles, a glossiness degree, a spatial noise level based on luminance degrees of reflection light rays, a luminance degree of a specular reflection light ray, and the like. Thus, a combination of any two of these plural kinds of the index value corresponds to the combination of the first index value and the second index value.

According to another aspect of the invention, the above-described reception portion receives an input of a target value of the first index value, and the display control portion extracts certain printing-medium types from among printing-medium types for each of which the target value of the first index value is included within the range of the first index value, on the basis a variation rate of the second index value, and displays the extracted printing-medium types on the user interface screen. That is, certain printing-medium types, each having a property of capable of reproducing a user's desired target value of the first index value, and further, having a small or large variation rate of a second index value, are presented to the user through the user interface screen. Alternatively, the above-described display control portion may display the printing-medium types, for each of which the target value of the first index value is included within the range of the first index value, on the user interface screen in order in accordance with the magnitude of the variation rate of the second index value. These configurations bring about a great help when a user selects a printing-medium type suitable for realizing his or her desired first index value.

According to another aspect of the invention, the above-described storage portion stores therein, for each of printing-medium types, a lower limit value and an upper limit value of an ink amount of a metallic ink to reproduce a metallic texture, and the above-described display control portion also displays the lower limit value and the upper limit value so as to cause them to correspond to an indication of the printing-medium type on the user interface screen. According to this configuration, a lower limit value and an upper limit value of an ink amount of a metallic ink to reproduce a metallic texture are indicated on the user interface screen so as to be corresponded to a printing-medium type, and thus, when a user selects a printing medium and uses a metallic ink, the above indication brings about a great help on his or her setting of a suitable amount of the metallic ink.

A technical thought according to the invention is not realized only in the form of a printing control apparatus, but may be realized in the form of any one of other appropriate objects (apparatuses). Moreover, it is also possible to recognize, for example, an invention of a method including processes corresponding to the features of the printing control apparatus according to any one of the aforementioned aspects (an information recording method), an invention of a program causing a computer to execute the method, and an invention of a medium which records therein the program, and which is readable from the computer.

BRIEF DESCRIPTION OF THE DRAWINGS

The invention will be described with reference to the accompanying drawings, wherein like numbers reference like elements.

FIG. 3 is a diagram illustrating an example of a database according to an embodiment of the invention.

FIG. 7 is a diagram illustrating another example of a database according to an embodiment of the invention.

DESCRIPTION OF EXEMPLARY EMBODIMENTS

Hereinafter, embodiments according to the invention will be described with reference to the drawings.

1. Outline Configuration of Apparatus Etc.

Figure 1:
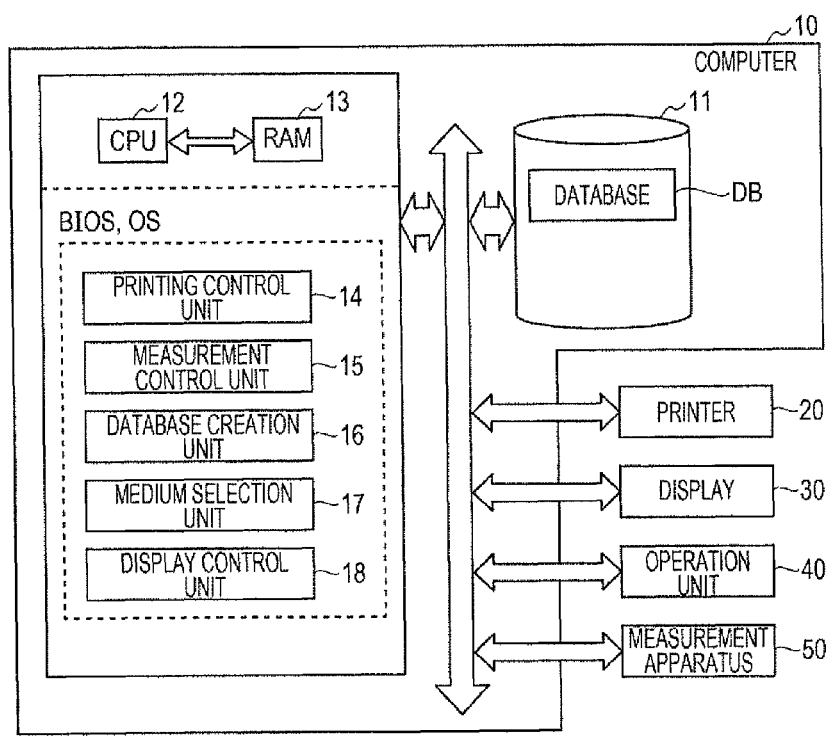
FIG. 1 is a diagram illustrating a software configuration and a hardware configuration according to an embodiment of the invention.

FIG. 1 illustrates a hardware configuration and a software configuration of a printing control apparatus 1 or the like according to this embodiment. This printing control apparatus 1 is mainly constituted by a computer 10. Further, in the case were the printing control apparatus 1 is supposed to be a system including a plurality of apparatuses, the printing control apparatus 1 includes a printer 20, a display 30 and the like. The computer 10 and the display 30 may be configured in an integrated manner just like a laptop type PC, a tablet type computer or the like, or may be mutually separated apparatuses. Further, the computer 10 may be also called an information recording apparatus, a display control apparatus, an image processing apparatus, or the like. In the computer 10, the CPU 12 realizes the respective functions of a printing control unit 14, a measurement control unit 15, a database creation unit 16, a medium selection unit 17, a display control unit 18 and the like by retrieving programs stored in a storage unit realized by a hard disc drive (HDD) 11 or the like, loading the programs into an internal memory, such as a RAM 13, and executing operations in accordance with the programs. The individual functions of these units will be described below.

In the HDD 11, a database DB created by the database creation unit 16 is stored. The computer 10 executes operations in accordance with programs (mainly a program corresponding to the printing control unit 14), and thereby controls the printer 20 as a printing apparatus via a predetermined interface. Further, the computer 10 is connected to the display 30 via a video interface (not illustrated), and is connected to an operation unit 40 including a keyboard, a mouse device, a touch pad, a touch panel and the like via an input interface (not illustrated). Moreover, the computer 10 is connected to a measurement apparatus 50 which is capable of performing measurement (color measurement) of a sample of a metallic ink described below.

2. Database Creation Processing

Figure 2:
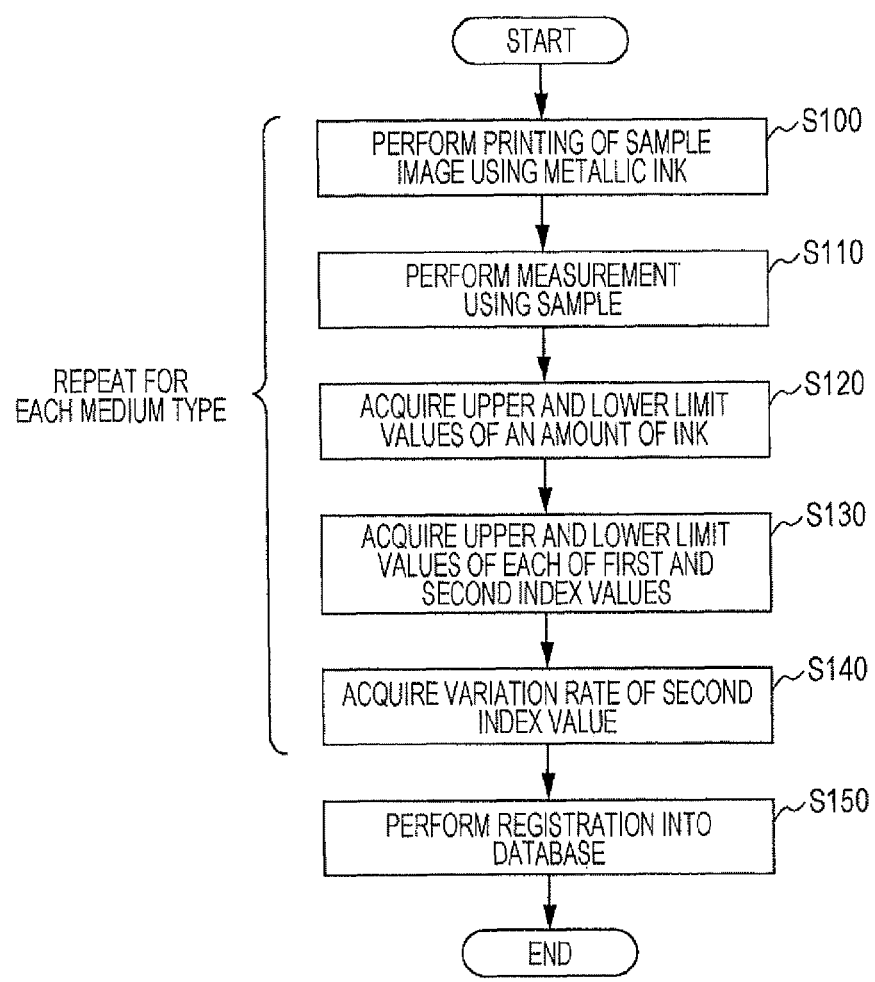
FIG. 2 is a flowchart illustrating database creation processing according to an embodiment of the invention.

FIG. 2 illustrates database creation processing, which is executed in the computer 10 mainly by the functions of the printing control unit 14, the measurement control unit 15 and the database creation unit 16, by using a flowchart. In step S100, the printing control unit 14 controls the printer 20, and thereby causes the printer 20 to execute printing using a given metallic ink regarding a sample image onto a printing medium of a certain specified type (a specified medium). The sample image is, for example, a chart in which there is arranged a plurality of patchy images, for which corresponding ink amounts (densities) of the metallic ink are stepwise different (for example, a ratio of the number of dots relative to the number of all dots per a unit area is stepwise changed from 0 percent to 100 percent). An ink which is called the metallic ink in this embodiment is one which is composed of materials including a metallic material, and, for example, a metallic ink disclosed in JP-A-2010-52225 can be used. The printer 20 is a printer model capable of executing printing onto a medium by using such a metallic ink in addition to inks having chromatic colors, such as cyan, magenta and yellow, and inks having achromatic colors, such as black and gray.

Hereinafter, a specified medium, on which sample images are printed by using the metallic ink in step S100, will be referred to as just a "sample". In step S110, the measurement control unit 15 controls the measurement apparatus 50, and thereby causes it to measure reflection light rays from the sample. The measurement apparatus 50 is an apparatus which is capable of, for example, in the case where a vertical direction relative to the surface of a sample is defined as an angle θ=0 degrees, irradiating the sample with a light ray from a light source at an angle θ=−45 degrees, receiving reflection light rays from the sample at a plurality of observation positions each forming an angle θ, and measuring a luminance degree L* at each of the observation positions. Further, the measurement apparatus 50 corresponds to a so-called scanner (an image reading apparatus), a gloss meter conforming to Japanese industrial standards (JIS) and being capable of measuring a glossiness degree, or the like. The measurement control unit 15 receives the results of measurements performed by the measurement apparatus 50.

In step S120, the database creation unit 16 acquires an upper limit value and a lower limit value of the ink amount of the metallic ink to be adhered onto the specified medium. Here, the upper limit value of the ink amount means an upper limit of an ink amount which does not cause the metallic ink to become blurred on the specified medium. The database creation unit 16 acquires the relevant upper limit value by, for example, allowing a user who has observed the sample to directly input the relevant upper limit value via the operation unit 40, or input the number or the like of any one of the patches forming the sample. It is supposed that the database creation unit 16 retains in advance correspondence relations between the numbers of the patches and the ink amounts of the metallic ink having been used in printing of the patches. Further, the lower limit value of the ink amount means an ink amount necessary for creating a minimum metallic texture on the specified medium. The database creation unit 16 acquires the relevant lower limit value by allowing a user who has observed the sample to directly input the relevant lower limit value via the operation unit 40, or input the number or the like of any one of the patches forming the sample.

Alternatively, not depending on the user's input, the database creation unit 16 may identify a patchy at which a measured value begins to become unstable because of blur or the like on the basis of the results of the measurements performed by the measurement apparatus 50, and may determine an ink amount corresponding to the identified patch as the upper value. Further, the database creation unit 16 may identify a patch, at which a predetermined minimum metallic texture (corresponding to, for example, a luminance degree L* of a specular reflection light ray) is created, on the basis of the results of the measurements performed by the measurement apparatus 50, and may determine an ink amount corresponding to the identified patch as the lower value.

In step S130, the database creation unit 16 acquires an upper limit value and a lower limit value of each of a plurality of index values representing metallic textures on the sample, on the basis of the results of the measurements performed by the measurement apparatus 50 in step S110. The index value for representing (evaluating) a metallic texture can be variously considered, and is, for example, a metallic degree which is calculated on the basis of the luminance values L*s at mutually different angles, a particular glossiness degree (for example, a glossiness degree at a measurement angle of 60 degrees), a spatial noise level based on the luminance values L*s of reflection light rays, the aforementioned luminance degree L* of a specular reflection light ray, or the like. In this Step S130, the database creation unit 16 acquires an upper limit value and a lower limit value for each of a first index value and a second index value which represent metallic textures, respectively. In this embodiment, the first index value indicates an index value a user actively controls in order to allow an ideal metallic texture to be expressed in a printing result. Meanwhile, the second index value indicates an index value which is a target whose variation is suppressed to the utmost extent when attempting to realize an ideal metallic texture by controlling the first index.

In this embodiment, as an example, the first index value corresponds to a "metallic degree", and the second index value corresponds to a "glossiness degree". The database creation unit 16 calculates the first index values (the metallic degrees) on the basis of the results of measurements for respective patches whose ink amounts of the metallic ink fall within a range between the lower limit value and the upper limit value of the ink amounts thereof having been acquired in step S120 above, and determines a minimum value and a maximum value of the calculated first index values as a lower limit value and an upper limit value of the first index value, respectively. Similarly, the database creation unit 16 acquires the second index values (the glossiness degrees) on the basis of the results of measurements for respective patches whose ink amounts of the metallic ink fall within a range between a lower limit value and an upper limit value of the ink amounts thereof, and determines a minimum value and a maximum value of the acquired second index values as a lower limit value and an upper limit value of the second index value, respectively. In addition, the metallic degree can be defined by using, for example, a formula (1) or a formula (2) disclosed in JP-A-2010-130405. Basically, the metallic degree is defined on the basis of a difference between luminance degrees L*s of reflection light lays at different reflection angles (for example, a reflection light ray at a reflection angle $\theta=30$ degrees and a reflection light ray at a reflection angle $\theta=-60$ degrees), and it can be said that the larger the value of the difference becomes, the larger the difference of luminance perceived when observing the sample at different angles becomes. If such a metallic degree can be controlled, metallic "glitter" or "high-grade sensation" which an observer perceives from a printing output can be changed, and thus, the control of the metallic degree leads to realization of a desired metallic texture.

In step S140, the database creation unit 16 acquires a variation rate of the second index value on the basis of the upper limit value and the lower limit value of the first index value and the upper limit value and the lower limit value of the second index value, these values having been acquired in step S130. This variation rate is defined as follows: (Upper limit value of second index value−Lower limit value of second index value)/(Upper limit value of first index value−Lower limit value of first index value). Such a variation rate means that, regarding a specified medium, when changing the ink amount of the metallic ink in order to change the first index value, the larger the variation rate is, the more largely the second index value is changed. Thus, for the purpose of controlling the first index value, a smaller variation rate is more suitable.

In step S150, the database creation unit 16 registers the values and the rate having been acquired in steps S120 to S140 into the database DB of the HDD 11 such that the values and the rate are correlated with the specified medium, wherein the above values and the rate are the upper limit value and the lower limit value of the ink amount of the metallic ink; the upper limit value and the lower limit value of the first index value; the upper limit value and the lower limit value of the second index value; and the variation rate of the second index value. In addition, the processes in steps S100 to S140 are repeatedly performed for each change in the type of specified medium. As a result, the database DB, such as an example shown in FIG. 3, is created. In FIG. 3, there is illustrated a state where various kinds of information are described for respective different medium types, such as media A, B, C, D . . . , and, as an example, regarding the medium A, there is recorded information including: the upper limit value and the lower limit value of the first index value are "55" and "25", respectively; the upper limit value and the lower limit value of the second index value are "27" and "22", respectively; the variation rate of the second index value is "0.17"; and the upper limit value and the lower limit value of the ink amount of the metallic ink are "70%" and "5%", respectively.

3. Medium Indication and Selection Processing

Figure 4:
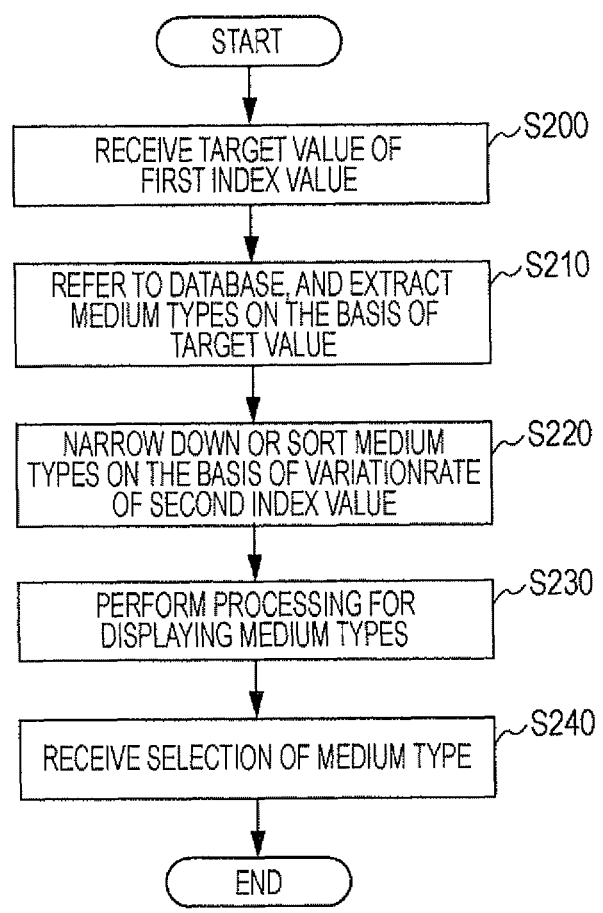
FIG. 4 is a flowchart illustrating medium display and selection processing according to an embodiment of the invention.

FIG. 4 illustrates medium indication and selection processing, which is performed in the computer 10 mainly by the functions of the medium selection unit 17 and the display control unit 18, by using a flowchart. The relevant processing is performed on the assumption that the database DB already exists. Further, the relevant processing is processing which starts in order to allow a user to select a medium type suitable for controlling the first index value, and is started when a user has pointed a specific menu via a user interface (UI) screen on the display 30. In addition, the medium type suitable for controlling the first index value is a medium type, for which, when causing the ink amount of the metallic ink to vary, the first index value varies but other index values do not vary (vary little). Inversely, a medium type unsuitable for controlling the first index value is a medium type, for which, when causing the ink amount of the metallic ink to vary, other index values also varies largely (so that, it is difficult to properly evaluate the variation of the first index value in conjunction with the variation of the ink amount of the metallic ink).

In step S200, the medium selection unit 17 receives a target value for the first index value. That is, a user operates the operation unit 40, and thereby inputs an arbitrary value as the target value for the first index value. In respect that the computer 10 is capable of executing processing in this step S200, it can be said that the computer 10 (the medium selection unit 17) functions as a reception unit for receiving the input of a target value of an index value. In step S210, the medium selection unit 17 searches the database DB to extract medium types for which the target value is included within a range of the first index value (a range from the upper limit value to the lower limit value of the first index value).

Figure 5:
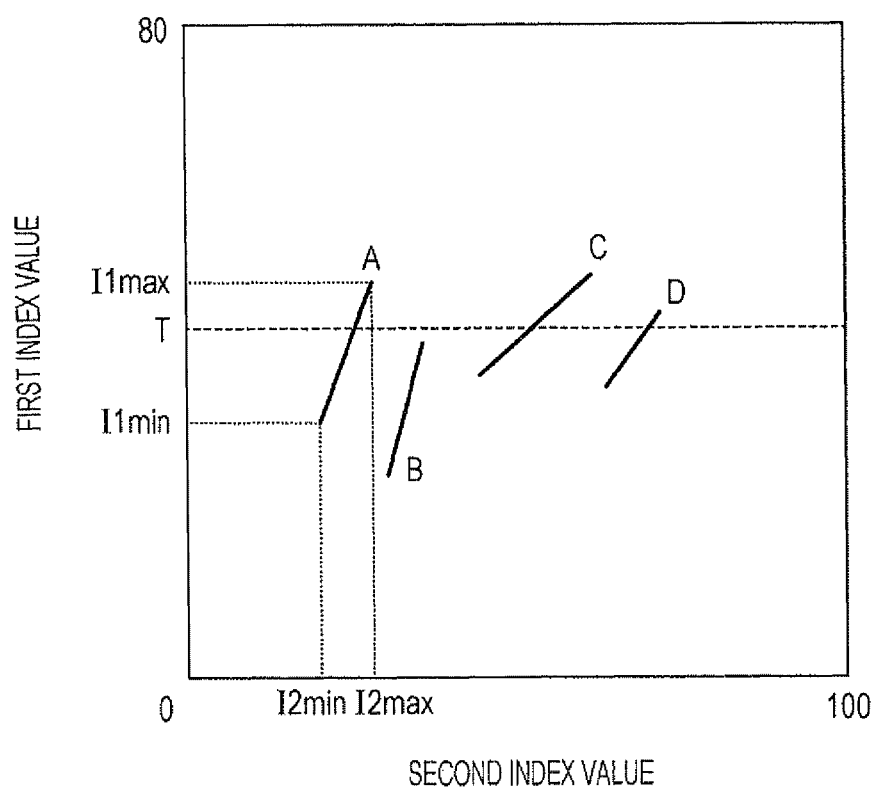
FIG. 5 is a diagram illustrating an example of a reproduction range of a first index value and a second index value for each of medium types, according to an embodiment of the invention.

FIG. 5 illustrates an example in which reproduction ranges regarding the first index value and the second index value with respect to the respective media A, B, C, D . . . registered in the database DB are indicated in full lines. In FIG. 5, a vertical axis corresponds to the first index value, and a horizontal axis corresponds to the second index value. For example, with respect to the medium A, a reproduction range regarding the first index value and the second index value is indicated by a straight line starting from an end-point defined by a lower limit value (I2min) of the second index value and a lower limit value (I1min) of the first index value, and terminating at an end-point defined by an upper limit value (I2max) of the second index value and an upper limit value (I1max) of the first index value. Further, FIG. 5 illustrates a target value T having been inputted by the user. According to this example, since the media A, C and D of the media A, B, C, D . . . each have the target value T within their reproduction ranges of the first index value, the media A, C and D are extracted as the medium types in step S210.

In step S220, the medium selection unit 17 refers to the database DB, and thereby, with respect to the medium types having been extracted above, performs narrowing down or sorting of medium types on the basis of the variation ratio of the second index value. When performing narrowing down of medium types, the medium selection unit 17 performs narrowing down to a medium type which has the smallest one of variation rates of the second index value among the medium types having been extracted above. Here, description will be made by taking FIG. 5 as an example. The variation ratio of the second index value can be represented by the reciprocal of a gradient (i.e., 1/gradient) of the full line indicating the above reproduction range, and thus, among the media A, C and D, the medium A has the smallest one of the variation ratios of the second index value, and the medium C has the largest one of variation ratios of the second index value. When performing sorting of medium types, the medium selection unit 17 sorts the medium types having been extracted above in ascending order in accordance with the magnitude of the variation rate of the second index value (or in descending order in accordance with the magnitude of the variation rate thereof). Sorting the media A, C and D in ascending order in accordance with the magnitude of the variation rate of the second index value results in such order as follows: medium A→medium D→medium C. In step S230, the display control unit 18 causes the display 30 to execute processing for displaying the medium having been narrowed down or the medium types having been sorted in step S220 on a predetermined UI screen.

Figure 6:
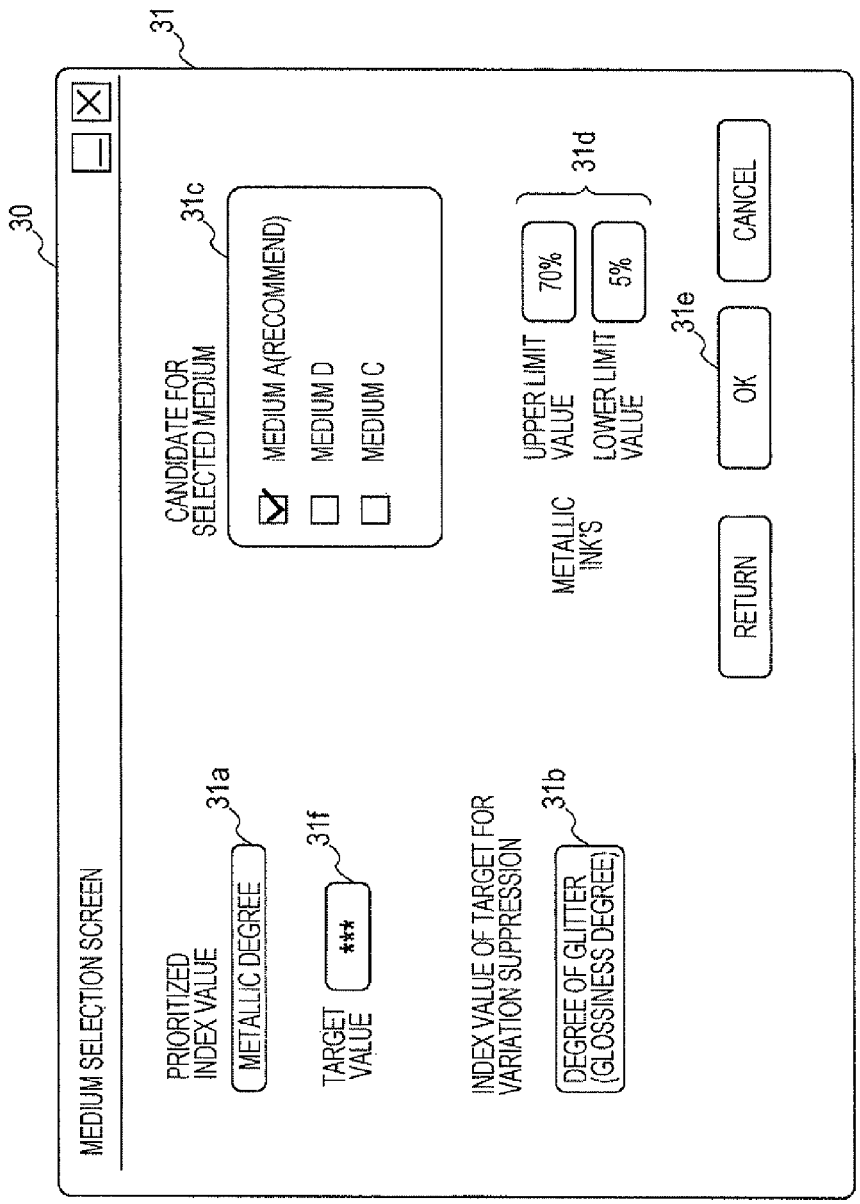
FIG. 6 is a diagram illustrating an example of a UI screen according to an embodiment of the invention.

FIG. 6 illustrates an example of a UI screen 31 which is indicated on the display 30 in step S230. The UI screen 31 includes a first-index-value indication column 31a, a second-index-value indication column 31b, a candidate-for-selection medium column 31c, an ink-amount upper/lower-limit-values indication column 31d, a target-value input column 31f and the like. Naturally, a concrete design of the UI screen 31 is not limited to the illustrated one. In the UI screen 31, the first-index-value indication column 31a, the second-index-value indication column 31b, the target-value input column 31f and the like each allow a content thereof to be indicated in a visible manner at the timing of step S200, and the candidate-for-selection medium column 31c and the ink-amount upper/lower-limit-values indication column 31d each also have a specific indication at the timing of step S230.

In the first-index-value indication column 31a and the second-index-value indication column 31b, a specific name of the first index value and a specific name of the second index value are indicated, respectively. As described above, in this embodiment, the first index value is the "metallic degree", and thus, "METALLIC DEGREE" is indicated in the first-index-value indication column 31a. Further, in this embodiment, the second index value is the "glossiness degree", and thus, in the second-index-value indication column 31b, "GLOSSINESS DEGREE" is indicated or, in order to convey an index value which is called the glossiness degree to users more sensuously, "DEGREE OF GLITTER" or the like is indicated in the second-index-value indication column 31b. In the example shown in FIG. 6, "PRIORITIZED INDEX VALUE" is indicated near the first-index-value indication column 31a. This is because an index value indicated in the first-index-value indication column 31a is an index value to be prioritized as a control target. That is, viewing the first-index-value indication column 31a allows user to recognize what kind of index value is a target for control appropriate to a medium type the user currently attempts to select. Similarly, in the example shown in FIG. 6, "INDEX VALUE OF TARGET FOR VARIATION SUPPRESSION" is indicated near the second-index-value indication column 31b. This is because the index value indicated in the second-index-value indication column 31b is an index value which is not a target for control. The target-value input column 31f is configured so as to allow a target value of the first index value to be inputted directly. That is, in step S200 above, the user inputs a target value to the target-value input column 31f by operating the operation unit 40.

In the case where medium types are sorted in accordance with a variation rate of the second index value in step S220 above, the sorting result is indicated in the candidate-for-selection medium column 31c in step S230. In the example shown in FIG. 6, there is illustrated a state where medium types capable of reproducing a target value of the first index value are sorted in ascending order in accordance with the magnitude of the variation rate of the second index value, and are indicated in the form of a list. Here, the medium A, which is indicated at the head (top) of the sorting result, has a minimum variation ratio of the second index value, and thus, an indication of "RECOMMEND", or the like, for prompting the user to select it is added thereto. In addition, in the case where medium types are narrowed down to a medium type having a minimum variation rate of the second index value in step S220 above, only the narrowed-down medium type (the medium A) is indicated in the candidate-for-selection medium column 31c. As described above, since the processing shown in FIG. 4 is processing for selecting a medium suitable for control of the first index value, it is predicted that, basically, media each having a narrow reproduction range of the second index value is selected. Thus, from this viewpoint, it is preferable to indicate individual media, resulting from sorting in ascending order in accordance with the magnitude of the variation ratio for the second index value, in the candidate-for-selection medium column 31c, or indicate only a medium having a minimum variation ratio of the second index value in the candidate-for-selection medium column 31*c*.

In the candidate-for-selection medium column 31*c*, check boxes are indicated in a one-to-one correspondence with indicated medium types. The user can temporarily select any one of the medium types indicated in the candidate-for-selection medium column 31*c* by operating the operation unit 40 and checking a corresponding check box, and further, the user can confirm the selection of the medium type as of then by operating an OK button 31*e* provided inside the UI screen 31. The medium selection unit 17 receives the confirmation of the selection of the medium type (step S240), and sets the selected medium type having been confirmed as a medium for use in printing processing to be performed subsequently. In addition, in conjunction with the above checking of one of the check boxes, an upper limit value and a lower limit value of an ink amount of a metallic ink, which are stored in the database DB so as to be corresponded to a medium type which is checked as of then, are indicated in the ink-amount upper/lower-limit-values indication column 31*d*.

That is, the user can confirm an upper limit and a lower limit of an ink amount of a metallic ink on the UI screen 31, which are related to the medium type having been selected inside the candidate-for-selection medium column 31*c*. Thus, in printing processing to be performed subsequently, it is possible to prevent such an inconvenience that the user specifies an ink amount of the metallic ink more than the upper limit, thereby causing a printing result to fail, or the user specifies an ink amount of the metallic ink less than the lower limit, thereby causing a printing result from which any metallic texture cannot be obtained to be outputted. In addition, in the case where only one medium type is indicated inside the candidate-for-selection medium column 31*c*, an upper limit value and a lower limit value of an ink amount of the metallic ink, which correspond to the only one medium type and are registered in the database DB, are indicated in the ink-amount upper/lower limit values indication column 31*d*.

As described above, according to this embodiment, the computer 10 retains the database DB which stores therein, for each of medium types for use in printing using a metallic ink, an upper limit value and a lower limit value of the first index value representing a metallic texture; an upper limit value and a lower limit value of the second index value, which is another index value representing a metallic texture; a variation ratio of the second index value; and an upper limit value and a lower limit value of an ink amount of the metallic ink. Thus, referring to the database DB makes it possible to explicitly grasp relations between medium types and reproduction ranges regarding a metallic texture, and thus, leads to a significant contribution to realization of a user's desired metallic texture on a medium.

Moreover, at least one medium type capable of reproducing a target value of the first index value, having been inputted by a user, is indicated on the UI screen 31 under the state where a medium type is narrowed down or medium types are sorted in accordance with a variation ratio of the second index value.

Thus, the user can significantly easily select, for example, a medium type suitable for controlling the first index value by viewing the UI screen 31.

4. Modification Example

The invention is not limited to the aforementioned embodiment, and can be carried out in various forms within a scope not departing from the gist of the invention. For example, the following modification examples can be carried out. The aforementioned embodiment and the following individual modification examples can be appropriately combined, and the resultant combinations are part of the disclosure's scope of the invention. Hereinafter, portions different from the embodiment having been described so far will be mainly described.

FIG. 7 illustrates an example of the database DB created in the flowchart shown in FIG. 2, and this example is different from that shown in FIG. 3. In the database DB shown in FIG. 7, for each of three or more kinds of index values (index values $\alpha, \beta, \gamma \ldots$, each representing a metallic texture), an upper limit value and a lower limit value for each of medium kinds are registered. The index values $\alpha, \beta, \gamma \ldots$ correspond to the aforementioned metallic degree, glossiness degree, spatial noise level, luminance degree L* of specular reflection light, and the like, respectively. That is, in this modification example, at the stage of creating the database DB, there is no concept of the first index value and the second index value, and an upper limit value and a lower limit value are calculated and acquired for each of various index values (step S130). The spatial noise level and the luminance degree L* of specular reflection light are also calculated or measured for each of patches forming a sample (the patches being ones whose amounts of metallic ink fall within a range between an upper limit value and a lower limit value of the amount of metallic ink, which have been acquired in step S120 above). Further, an upper limit value and a lower limit value of the spatial noise levels regarding the respective patches, as well as an upper limit value and a lower limit value of the luminance degrees L*s of specular reflection light rays regarding the respective patches, are obtained.

In addition, the spatial noise level can be obtained in such a way as follows: an image having been read in from a patch is converted into an image of an L*a*b* color system by using an ICC profile or the like; the L* channel of the image is converted into spatial frequencies by means of a Fourier transformation or the like, and as a result, a Wiener spectrum WS (u) is acquired; a visual spatial frequency characteristic VTF (u) is applied to the Wiener spectrum; and the Wiener spectrum having been subjected to the application (filtering) of the visual spatial frequency characteristic is integrated. Further, in this modification example, at the stage of creating the database DB, it is not yet determined which ones of the index values $\alpha, \beta, \gamma \ldots$ correspond to the first index value and the second index value, and thus, an item corresponding to the variation rate of the second index value does not exist in the database DB (thus, the processing in step S140 is not executed).

Figure 8:
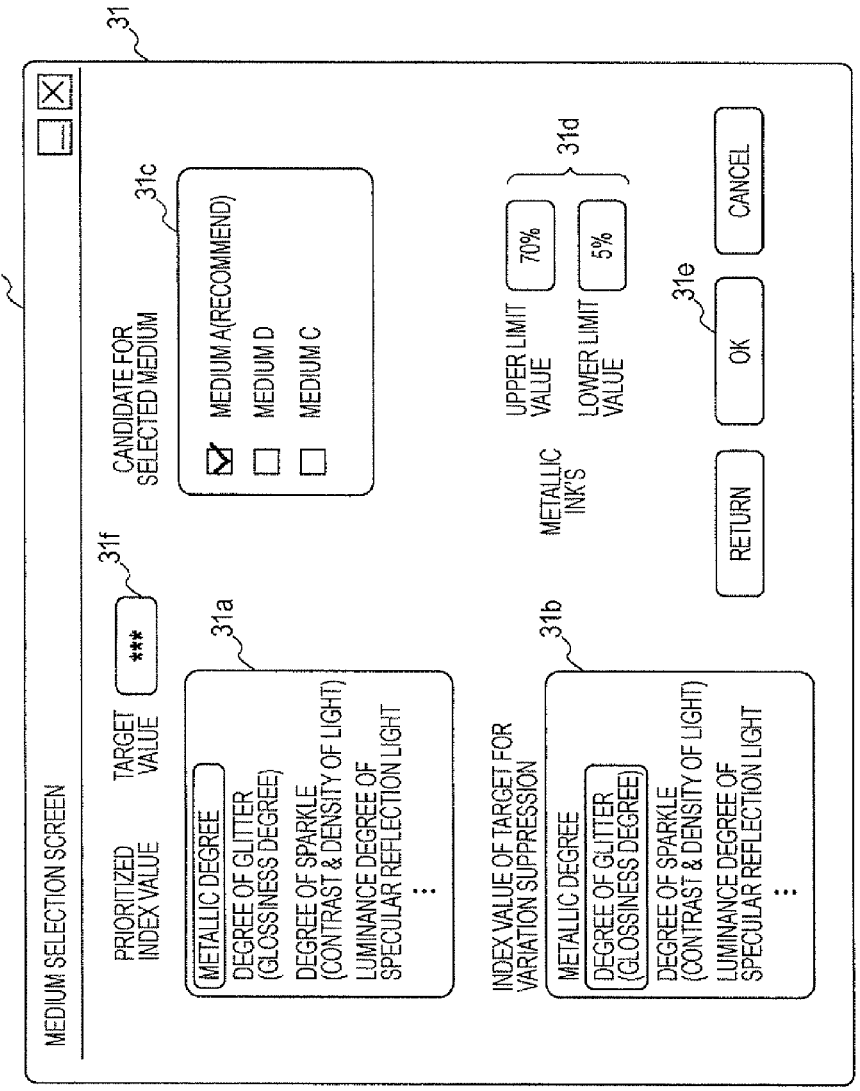
FIG. 8 is a diagram illustrating another example of a UI screen according to an embodiment of the invention.

FIG. 8 illustrates an example of the UI screen 31 which is displayed on the display 30 in the case where the flowchart shown in FIG. 4 is executed on the assumption that the database DB shown in FIG. 7 exists. In this modification example, a user can arbitrarily select a prioritized index value (the first index value) from inside the first-index-value indication column 31*a* indicated on the UI screen 31, and further, the user can arbitrarily select an index value targeted for variation suppression (the second index value) from inside the second-index-value indication column 31*b* indicated on the UI screen 31. That is, the user can arbitrarily set a combination of the first index value and the second index value. In addition, it is not allowed that the user selects the same index value in both of the first-index-value column 31*a* and the second-index-value column 31*b*. After having completed to select the first index value in the first-index-value indication column 31*a*, the user inputs a target value of the first index value to the target-value input column 31*f*. As a result of these operations, the medium selection unit 17 receives the inputs of a kind of the first index value, a kind of the second index value and a target value of the first index value.

In step S220 of this modification example, before performing sorting or the like of medium types on the basis of a variation rate of the second index value, it is necessary to calculate the variation rate of the second index value. That is, regarding each of the medium types having been extracted on the basis of the target value of the first index value in step S210, a variation rate of the second index value is calculated on the basis of an upper limit value and a lower limit value of an index value corresponding to the first index value, and an upper limit value and a lower limit value of an index value corresponding to the second index value, among the upper limit values and the lower limit values of the respective index values α, β, γ ... registered in the database DB. In the example shown in FIG. 8 there is illustrated a state where "METALLIC DEGREE" and "GLOSSINESS DEGREE" are selected as the first index value and the second index value, respectively, but, for example, "GLOSSINESS DEGREE" and "DEGREE OF SPARKLE (CONTRAST & DENSITY OF LIGHT)" may be selected as the first index value and the second index value, respectively. In addition, the degree of sparkle is a term which is indicated to convey such an index value as the above spatial noise level to users more sensuously, and is actually the above spatial noise level. In such a case, in step S220, for respective medium types having been extracted as ones capable of reproducing a target value of the glossiness degree, variation rates of the degree of sparkle (the spatial noise level) are calculated, and medium types resulting from sorting the extracted medium types, or the like, are indicated in the candidate-for-selection medium column 31c in ascending order in accordance with the magnitude of the calculated variation rate. In addition, for each of all combinations of various index values, information related to the above variation rate may be recorded in the database DB in advance.

As described above, according to this modification example, a user can arbitrarily select the first index value, which the user desires as a control target, from among a plurality of index values each representing a metallic texture, and further, the user can select a medium suitable for controlling the arbitrarily selected first index value (that is, a medium which makes it possible to evaluate the degree of the first index value with accuracy).

In addition, hereinbefore, the description has been made supposing a scene where an environment, which enables a user to easily select a medium having a minimum variation rate of the second index value, is presented to the user. In contrast, processing may be also performed such that, for example, when starting printing processing, a user instructs the computer 10 to execute an automatic selection of a medium type, and upon reception of the instruction, the computer 10 executes processing from step S200 to step S220 above, identifies a medium type having a minimum variation rate of the second index value among medium types capable of reproducing a target value of the first index value, and automatically sets the identified medium type as a medium for use in printing processing. According to this configuration, it is possible for a user to cause the computer 10 to set a medium suitable for printing using a metallic ink merely by setting a target value of the first index value.

Further, hereinbefore, the description has been made on the assumption that a target value of the first index value is a numerical value, but the target value may be a numerical value range having a numerical width. In this case, in step S210, the medium selection unit 17 searches the database DB to extract medium types each having a numerical value range, which corresponds to the above target value, falling within a range of the first index value to range between an upper limit value and a lower limit value of the first index value). Next, in step S220, the medium selection unit 17 refers to the database DB, and thereby, for the above extracted medium types, processing for narrowing down or sorting of medium types is performed on the basis of the variation rate of the second index value. In this case, processing may be performed such that the extracted medium types are not narrowed down to a medium type having a minimum variation rate of the second index value, but are narrowed down to a medium type having a maximum variation rate thereof, and only the medium type having the maximum variation rate of the second index value is indicated in the candidate-for-selection medium column 31c. In the case where the extracted medium types are narrowed down to a medium type having a minimum variation rate thereof, a medium type having a large reproduction range of the second index value can be selected, thus enabling increase of the number of options for a metallic texture to be realized.

Further, in the above processing, only an input of a target value of the first index value is received, but an input of a target value of the second index value may be also received. In this case, in step S210, the medium selection unit 17 searches the database DB to extract medium types each of which has a target value (a numerical value range) of the first index value falling within a range of the first index value (a range between an upper limit value and a lower limit value of the first index value), and each of which has a target value of the second index value falling within a range of the second index value (a range between an upper limit value and a lower limit value of the second index value). In addition, the target value of the second index value may be also a numerical value range having a numerical width.

Further, in the above processing, a user inputs a target value to the target-value input column 31f by operating the operation unit 40, but processing may be performed such that, by allowing a user to specify a medium, such as a gold leaf, or a printing result in which the user's desired metallic texture was realized, a target value, which is correlated with the specified medium in advance, is inputted. In this case, a different medium capable of realizing a metallic texture of a certain medium can be selected, and thus, a user can easily select a printing medium suitable for realizing the user's desired metallic texture.

Further, a concrete product which executes the above-described processing is not limited to the computer 10. For example, the printer 20 may execute part of or the whole of the processing shown in FIG. 2 and FIG. 4 by using resources, such as a CPU and a memory, incorporated in the printer 20, and being in accordance with programs installed inside the printer 20 itself. Further, the printer 20 may display the above UI screen 31 on a display, such as a liquid crystal panel, included in the printer 20 itself. Moreover, the printer 20 itself may receive a selection of a medium type.

What is claimed is:

1. A controller for use in a printing apparatus ejecting a metallic ink, comprising:
   a medium selection unit that receives input of an item specified by a user on a user display screen with respect to a metallic texture, and based on the item determines a printing-medium type suitable for realizing the metallic texture; and
   a display control unit that causes the user display screen to display the printing-medium type suitable for the item, wherein the item is a first index value related to the metallic texture, and the printing-medium type suitable for realizing the metallic texture is one in which, when an amount of the metallic ink varies, the first index value varies but a second index value that is different from the first index value does not vary, and the first index value and the second index value are two of a metallic degree, a glossiness degree, a spatial noise level based on a luminance degree of reflected light, and a luminance degree of specular reflected light.

2. The controller of claim 1, wherein the display control unit causes the user display screen to display a plurality of printing-medium types suitable for the item.

3. The controller of claim 2, wherein the display control unit causes the user display screen to display the plurality of printing-medium types suitable for the item in descending order in accordance with a degree of suitability.

4. The controller of claim 1, wherein the medium selection unit determines a printing medium suitable for the item on the basis of an item related to a metallic texture, which is different from the item.

5. A control method for use in a printing apparatus ejecting a metallic ink, the control method comprising:

receiving an item desired by a user with respect to a metallic texture, the item being displayed on a user interface screen;

based on the item, determining a printing-medium type suitable for realizing the metallic texture; and displaying the printing-medium type suitable for the item on the user interface screen, wherein the item is a first index value related to the metallic texture, and the printing- medium type suitable for realizing the metallic texture is one in which, when an amount of the metallic ink varies, the first index value varies but a second index value that is different from the first index value does not vary, and the first index value and the second index value are two of a metallic degree, a glossiness degree, a spatial noise level based on a luminance degree of reflected light, and a luminance degree of specular reflected light.

\* \* \* \* \*